United States Patent [19]

Barkan

[11] Patent Number: 5,003,164

[45] Date of Patent: Mar. 26, 1991

[54] PORTABLE LASER SCANNING SYSTEM AND SCANNING METHODS HAVING A MOTOR AMPLITUDE REGULATOR CIRCUIT

[75] Inventor: Edward Barkan, South Setauket, N.Y.

[73] Assignee: Symbol Technologies Inc., Bohemia, N.Y.

[21] Appl. No.: 428,834

[22] Filed: Oct. 30, 1989

[51] Int. Cl.[5] ............................................. G06K 7/10
[52] U.S. Cl. ................................... 235/472; 235/467
[58] Field of Search ................. 235/467, 472; 350/6.1; 250/566

[56] References Cited

U.S. PATENT DOCUMENTS

| | | | |
|---|---|---|---|
| 3,631,274 | 12/1971 | Stauder | 310/66 |
| 3,636,317 | 1/1972 | Torrey | 235/61.12 N |
| 3,774,014 | 11/1973 | Berler | 235/61.11 E |
| 3,818,467 | 6/1974 | Willis | 340/224 |
| 4,025,761 | 5/1977 | Hayosh et al. | 235/61.11 E |
| 4,041,322 | 8/1977 | Hayosh et al. | 250/568 |
| 4,251,798 | 2/1981 | Swartz | 235/472 |
| 4,387,297 | 6/1983 | Swartz et al. | 235/462 |
| 4,496,831 | 1/1985 | Swartz et al. | 235/472 |
| 4,593,186 | 6/1986 | Swartz et al. | 235/472 |

Primary Examiner—Harold I. Pitts

[57] ABSTRACT

A lightweight hand-held scanning device for repetitively scanning a laser light source across a target having a laser light generating means and at least one high speed scanning motor controlled by a motor amplitude regulator circuit which automatically controls the amplitude of oscillation of the shaft of the high speed scanning motor. The amplitude control is accomplished by using a closed loop control system that supplies the ac stator windings of the scanning motor with periodic triangular current waveforms for energizing and de-energizing the ac stator coils. The signal that closes the control loop is a feedback signal obtained from the dc stator windings of the motor which indicates the amplitude of oscillation. By controlling the amplitude of oscillation, the high speed scanning motor can maintain a consistent scanning speed and use less power.

19 Claims, 5 Drawing Sheets

PORTABLE LASER SCANNING SYSTEM AND SCANNING METHODS HAVING A MOTOR AMPLITUDE REGULATOR CIRCUIT

REFERENCE TO RELATED APPLICATIONS

This application is related to U.S. Pat. applications Ser. Nos. 322,188; 382,722 and 465,980 assigned to Symbol Technologies, Inc.

BACKGROUND OF THE INVENTION

1. Field of the Invention

The present invention relates to laser scanning systems for reading bar code symbols, and more particularly, to motor control circuits for hand held portable laser scanning heads.

2. Description of the Prior Art

The increased use of bar code symbols to identify products, particularly in retail business, has resulted in the development of various bar code reading systems. Many users of bar code readers require portable hand held scanners which place a premium of size, weight and power requirements for the devices. One such system is a laser scanning bar code reading system as described in U.S. Pat. No. 4,496,831, assigned to the same assignee as the present invention and incorporated by reference herein.

The laser scanning system disclosed in U.S. Pat. No. 4,496,831 includes a portable hand held scanning head which may be embodied in various shapes but preferably has a gunshaped housing made of lightweight plastic. A handle and barrel portion are provided to house the various components of the scanning head therein. Within the barrel portion are mounted a miniature light source, a miniature optic train including focusing lenses for directing the light source across a bar code symbol, and miniature sensing means for detecting reflected light from the bar code symbol being scanned.

The miniature light source comprises a laser tube such as a co-axial helium-neon laser tube, or preferably, a semiconductor laser diode, which is considerably smaller and lighter than a laser tube, thus reducing the required size and weight of the scanning head, and making the scanning head easier to handle and more maneuverable. Light generated by the light source passes through the optic train which focuses the beam to impinge upon the scanning means, which are mounted in the light path within the barrel portion of the scanning head. The scanning means sweeps the laser beam across the bar code symbol, and comprises at least one scanning motor for sweeping the beam lengthwise across the symbol, and may comprise two motors, where the second motor sweeps the beam widthwise across the symbol. Light reflecting means such as mirrors are mounted on the motor shafts to direct the beam through the outlet port to the symbol. The sensing means then detects and processes the light reflected off the symbol, and generally comprises photosensitive elements such as semi-conductor photodiodes.

The structural aspects of the scanning motor are analogous to a simplified stepper motor which is a device used to convert electrical pulses into discrete mechanical angular movements every time the currents in the stator windings are changed. By alternately energizing and de-energizing the two stator coils of a stepper motor, the magnetic interaction between the rotor poles and the stator poles causes the rotor to turn in discrete angular steps over the entire 360 degree circumference of the output shaft. In contradistinction to stepper motors, the scanning motor is controlled by a control means which is operative to cause the shaft of the motor to oscillate first in one circumferential direction over an arc length less than 360 degrees and secondly in the opposite circumferential direction over an arc length less than 360 degrees, and thereafter to repeat the aforementioned cycle at a high rate of speed.

The motor control means for the above prior art scanning head includes a reference means for applying a generally constant low level direct current voltage to one of the stator windings, thereby energizing one set of stator poles as north and south. The motor control means also includes a variable means for applying a periodic voltage of time-varying amplitude to the second set of stator windings, thereby energizing the second set of stator poles as north and south. The first set of stator poles, due to the dc current, define a neutral rotor position. When the rotor is displaced by a small angle from the neutral position, the stator poles exert a restoring torque on the rotor which is approximately proportional to the product of the dc current and the rotor displacement. The restoring torque is very similar to that generated by a spring. The spring-like action of the dc current and the rotating mass form an oscillatory system with a natural resonant frequency which increases as the dc current increases. The second set of stator poles exert an oscillatory torque on the rotor, which is thus forced to oscillate at the same frequency of the periodic voltage. The periodic voltage is referred to as the driving voltage, the current it generates is known as the driving current, and its frequency is called the driving frequency. When the natural resonant frequency is equal to the driving frequency, a condition of resonance exists, and the driving current required to maintain a given amplitude of oscillation is at its minimum value.

In another aspect of the above referenced patent, a closed loop control circuit is disclosed to provide linear tracking of the laser scanning beam The control circuit comprises a primary coil, two or more secondary coils and a moveable shield. The shield is fixedly mounted on the motor shaft for joint oscillatory movement therewith, and is located between the primary coil and two secondary coils. Tuning capacitors are used to tune the secondary coils to resonate at the frequency at which the primary coil is excited, the secondary coils are inductively coupled to it to establish an oscillating magnetic field, an ac voltage of the same high oscillating frequency as the primary coil appears across the secondary coils, and is detected by sensing circuitry. The sensing circuitry detects the voltage on its respectively associated secondary coil, and feeds the voltages to a differential amplifier for generating a difference signal which is proportional to the angular displacement of the shaft. This difference signal is, in turn, fed to one input of another differential amplifier whose input is supplied with a control voltage. The output of the amplifier is then fed to the stator coil The aforementioned patent, therefore, sets forth an elaborate system to control the amplitude of oscillation of the motor shaft. However, the control circuit of the above referenced patent requires additional sensing circuits and apparatus to provide the feedback control signals.

SUMMARY OF THE INVENTION

The present invention is an improvement for a handheld laser scanning system used to scan bar code symbols having a novel motor drive circuit for the scanning motor. The motor amplitude regulator circuit of the present invention controls the amplitude of oscillation of the high speed scanning motor. The scanning motor includes a pair of stator coil windings respectively mounted in upper and lower stator housings. A permanent magnet rotor is surrounded by the stator coils and is operatively connected to the output shaft of motor for joint oscillatory movement therewith.

The motor amplitude regulator circuit of the present invention controls the amplitude of oscillation of the scanning motor so that a consistent scanning speed can be obtained regardless of individual scanning motor variations. In addition, the frequency of oscillation is set to be near or at the resonant frequency of the scanning motor. However, the frequency, once set, is not automatically controlled or regulated.

By employing the circuit of the present invention, the dc current supplied to the dc stator windings of the scanning motor is set at a predetermined level in order to energize one set of stator poles as north and south, thereby causing the magnetic north and south poles of the rotor to align themselves with the stator poles. In addition, the dc current is set at a predetermined level in order to produce resonance in motor operation. Resonant motor operation is achieved when the frequency of oscillation of the motor shaft is at or near the natural resonant frequency of the motor. An increase in current supplied to the dc stator windings causes an increase in the natural resonant frequency, while a decrease in supplied current cause the opposite effect.

The motor amplitude circuit of the present invention controls the amplitude of oscillation of the scanning motor. By controlling a periodic, time-varying current waveform, such as a triangular waveform, entering the ac stator windings of the motor, the amplitude of oscillation of the motor shaft can be controlled. Increased current supplied to the ac stator windings of the motor causes an increase in the amplitude of oscillation, while a decrease in supplied current causes the opposite effect. The frequency of the periodic waveform is chosen so that the scanning motor is in a resonant mode of operation as discussed above.

The amplitude control function is accomplished by the motor amplitude regulator circuit of the present invention by utilizing a single feedback signal from the motor which indicates amplitude of oscillation. The feedback signal is derived from the dc stator windings of the scanning motor. By properly manipulating and processing the aforementioned signal, amplitude control can be achieved by controlling the current to the ac stator windings of the scanning motor.

The hand-held scanning head employing the novel motor amplitude regulator circuit of the present invention overcomes the limitations of the prior art by providing for the automatic amplitude control of a high speed scanning motor to facilitate accurate and fast scanning of a bar code symbol. By regulating the amplitude of oscillation of the scanning motor shaft, a consistent scanning speed can be obtained thereby increasing the efficiency of the motor. In addition, by operating the motor in a near resonant mode, the required driving power is greatly reduced.

Electrical elements employed in any electrical circuit require a certain amount of space of area, and the amount of space or area required is determined first by the physical size of the element, and secondly by the amount of heat and other forms of energy dissipated by the particular electrical circuit. In the design of a hand-held device, mounted on the shaft of the scanning motor. The oscillation of the shaft determines the length of the scanning beam at the output port for scanning the bar code symbol. Preferably, the oscillation is over a 5 degree arc in each direction. If a second motor is provided, the light reflected from the first mirror on the first motor reflects off a second mirror provided on the shaft of the second motor, which oscillates in each direction to determine the width of the scanning beam at the output to scan the symbol. The value of the reference signal is determined by the amount of circumferential movement desired in the shaft of the motor. When the amplitude of oscillation is too high, the motor amplitude regulator circuit supplies less current to the ac stator windings thus causing a decrease in the amplitude of oscillation. When the amplitude of oscillation is too low, the motor amplitude regulator circuit supplies more current to the ac stator windings thus causing an increase in the amplitude of oscillation.

The frequency of oscillation of the scanning motor is not automatically controlled; however, by proper selection of the current supplied to both the ac and dc stator windings of the scanning motor, the scanning motor can be made to operate at or near its resonant mode. The scanning motor is in resonance when the frequency of the driving current, which is the current supplied to the ac stator windings of the scanning motor, is equal to the natural frequency of the motor. Therefore, the current supplied to the dc stator windings of the scanning motor can be selected to achieve a certain resonant frequency of the motor.

The object of the present invention is to regulate the motor amplitude if the motor is running exactly at resonance, or slightly off resonance, There is therefore no need to precisely control the drive frequency to match the motors natural frequency, or to precisely control the current through the dc winding so the natural frequency exactly matches the drive frequency. The circuit will maintain a constant amplitude even if there is a mismatch between the drive frequency and the natural frequency, or if one of then drifts with respect to the other one.

Referring now to FIG. 1, there is shown a block diagram illustrating the motor amplitude regulator circuit space or area becomes a critical design consideration. As stated previously, in the present circuit both amplitude regulation and frequency setting functions are accomplished via a closed loop control system; however, external feedback sensing elements which may be expensive, require additional space and consume more power are not necessary because the feedback signal is supplied from the motor. Accordingly, the present invention provides a scanning head for a bar code symbol scanning system having a new and practical means to regulate the high speed scanning motor of such a portable laser scanning system where small space, low weight and low power consumption are design criteria. The motor drive circuit of the invention may also be useful in controlling high speed motors in a variety of other applications, such as for example, autofocusing systems of high speed cameras and the automatic scan or seek function in audio and video systems.

BRIEF DESCRIPTION OF THE DRAWING

The foregoing features of this invention will become more readily apparent and may be understood by referring to the following detailed description of a preferred embodiment of the motor amplitude regulator circuit, taken in conjunction with the accompanying drawings, in which.

DESCRIPTION OF THE PREFERRED EMBODIMENT

Figure 1:
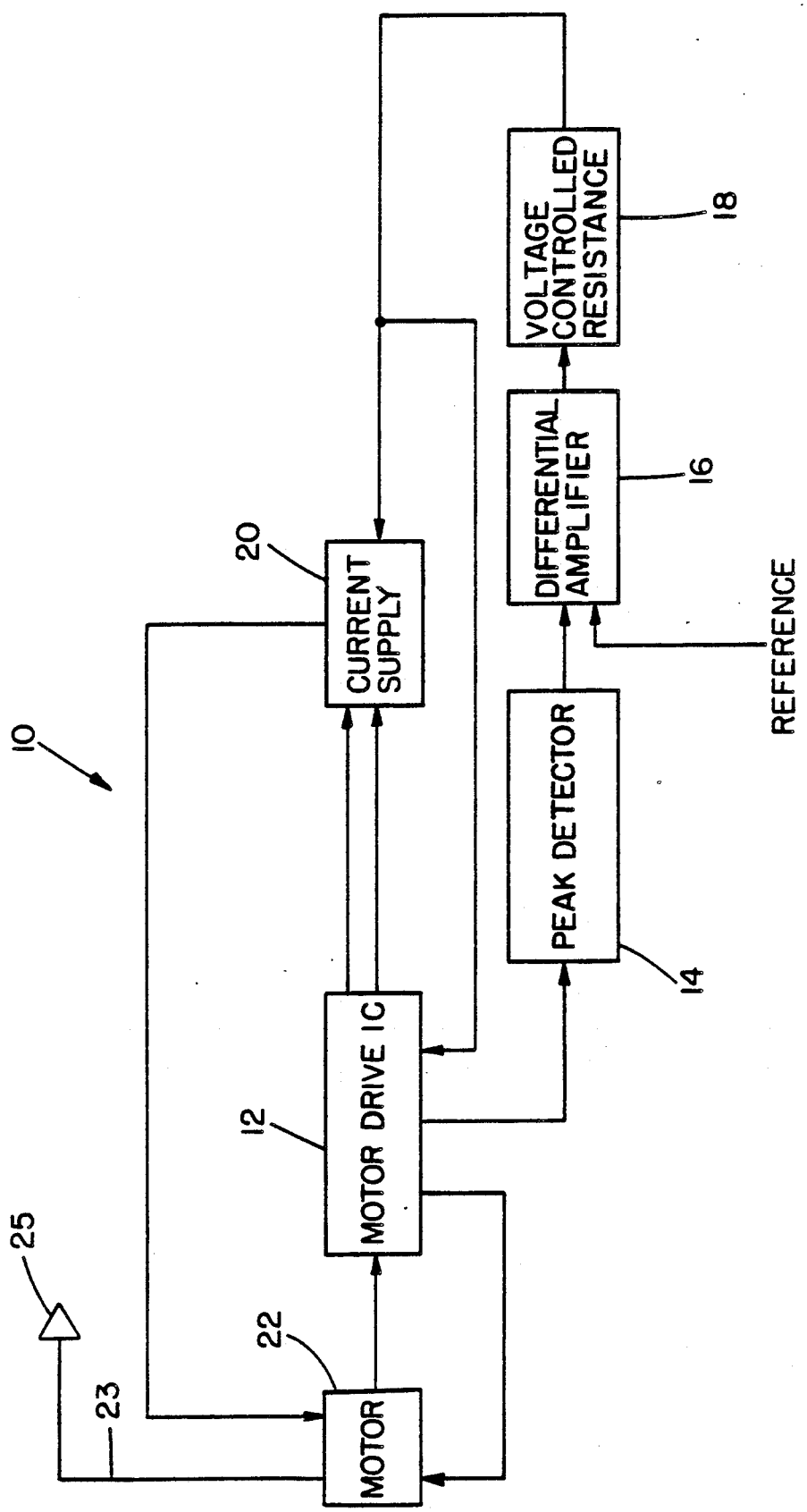
FIG. 1 illustrates a block diagram of the motor amplitude regulator circuit of the present invention.

The hand-held bar code scanning head of the present invention for use in laser scanning systems is provided with a novel motor amplitude regulator circuit which automatically controls the amplitude of oscillation of the scanning motor and also allows the scanning motor to be set into a resonant mode of operation.

Amplitude of oscillation control is accomplished through a feedback control system that utilizes the generated voltage from the dc stator windings of the scanning motor as a feedback signal which is indicative of the amplitude of oscillation of the motor shaft. The generated voltage is derived from the dc stator windings of the scanning motor and amplified. The amplified generated voltage is then fed into a differential amplifier which compares the amplified generated voltage with a reference voltage that is chosen in order to achieve a certain amplitude of oscillation. By comparison of the amplitude of the generated voltage with the reference signal, the ac current supplied to the ac stator windings of the scanning motor can be manipulated to bring about the desired control action, which is an increase or decrease in amplitude of oscillation of the scanning motor shaft.

In the scanning operation, the laser light source generates a laser beam which passes through the lens system or optic train for focusing and is reflected off a mirror 10. The circuit is comprised of a motor drive integrated circuit 12, a peak detector circuit 14, a differential amplifier circuit 16, a voltage controlled resistance circuit 18, a current supply 20, and a high speed scanning motor 22 with a motor shaft 23 and a light reflecting means 25 attached thereto.

The motor drive integrated circuit 12 is a multi-purpose integrated circuit designed to perform a variety of scanning motor control functions and will hereinafter be discussed in detail. Integrated circuit 12 is constructed according to designer's specifications and is used in the motor amplitude regulator circuit 10 as an alternative to discrete motor control circuitry. Any of the functions performed by integrated circuit 12 can be performed by discrete analog circuitry; however, while integrated circuit 12 might not greatly enhance system performance, it requires less area then discrete circuitry.

Figure 5:
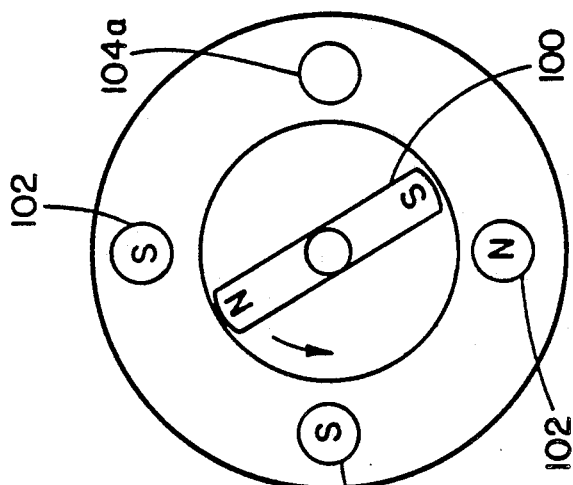
FIG. 5 is a diagrammatic view of the motor with the rotor at its limited sweep in the counter-clockwise direction.
Figure 4:
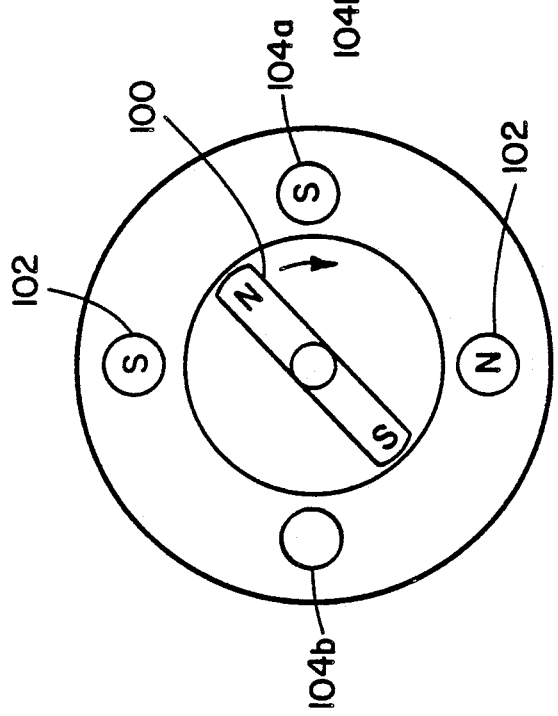
FIG. 4 is a diagrammatic view of the motor with the rotor at its limited sweep in the clockwise direction.
Figure 3:
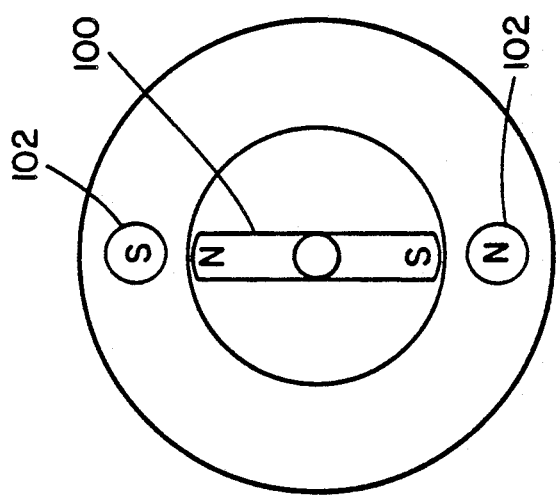
FIG. 3 is a diagrammatic view of the motor with the rotor in its equilibrium position.

The motor drive integrated circuit 12 supplies a constant, regulated current, preferably about 7 milliamps, to the dc stator windings of the scanning motor 22. This regulated current energizes one set of stator windings or poles 102 as magnetic north and south as shown in FIGS. 3, 4 and 5. In addition, the 7 mA current is selected to achieve a secondary purpose which is to achieve a particular resonant frequency for the scanning motor 22. All oscillatory components can be characterized by a resonant frequency, and for the scanning motor 22, the resonant frequency is determined by, among other things, the mass of the moving structure and by the fixed magnetic field which is established by the stator windings. A general equation for the resonant frequency of the scanning motor 22 is given by $$W_r = \left(\frac{KIq}{J}\right)^{\frac{1}{2}}, \tag{1}$$

where
$W_r$ = natural resonant frequency in radians per second,
$K$ = motor constant,
$I$ = dc current,
$q$ = number of pole pairs, and
$J$ = moment of inertia.

As can be seen in the above equation, the resonant frequency, $W_r$, can be altered by changing the amount of current, I, into the dc stator windings of the scanning motor 22. The point at which the resonant frequency of the motor equals the frequency of the driving current is resonance. At resonance, a large amplitude of motion for the motor shaft is obtained for a relatively small input power. In a resonance mode of operation, the torque supplied by the dc stator windings of the scanning motor 22 exactly equals the torque caused by inertia, effectively cancelling each other out and resulting in the motor consuming much less power during operation. Therefore, the dc current supplied by the integrated circuit 12 provides a dc current to achieve a predetermined resonant frequency of the scanning motor 22.

The motor drive integrated circuit 12 also amplifies the voltage that is generated across the terminals of the dc stator windings of the scanning motor 22. The generated voltage is proportional to the product of the magnetic flux created by the magnetic field of the rotor and the angular velocity of the scanning motor shaft, which is a concept that is known in the art. The voltage signal obtained from the dc stator windings is a periodic signal comprised of many harmonic components and possibly a constant dc term. The present invention utilizes the ac portion of the generated voltage which is proportional to the angular velocity of the motor shaft As stated previously, the motor drive integrated circuit can be replaced by discrete analog circuitry. In this case, the amplification can be accomplished via a simple operational amplifier circuit with a gain that can be adjusted by the use of various resistance values that comprise the external components of the operational amplifier circuit. In addition, the regulated current mentioned in the previous paragraph can be supplied by a simple power supply circuit utilizing a zener diode.

Figure 2:
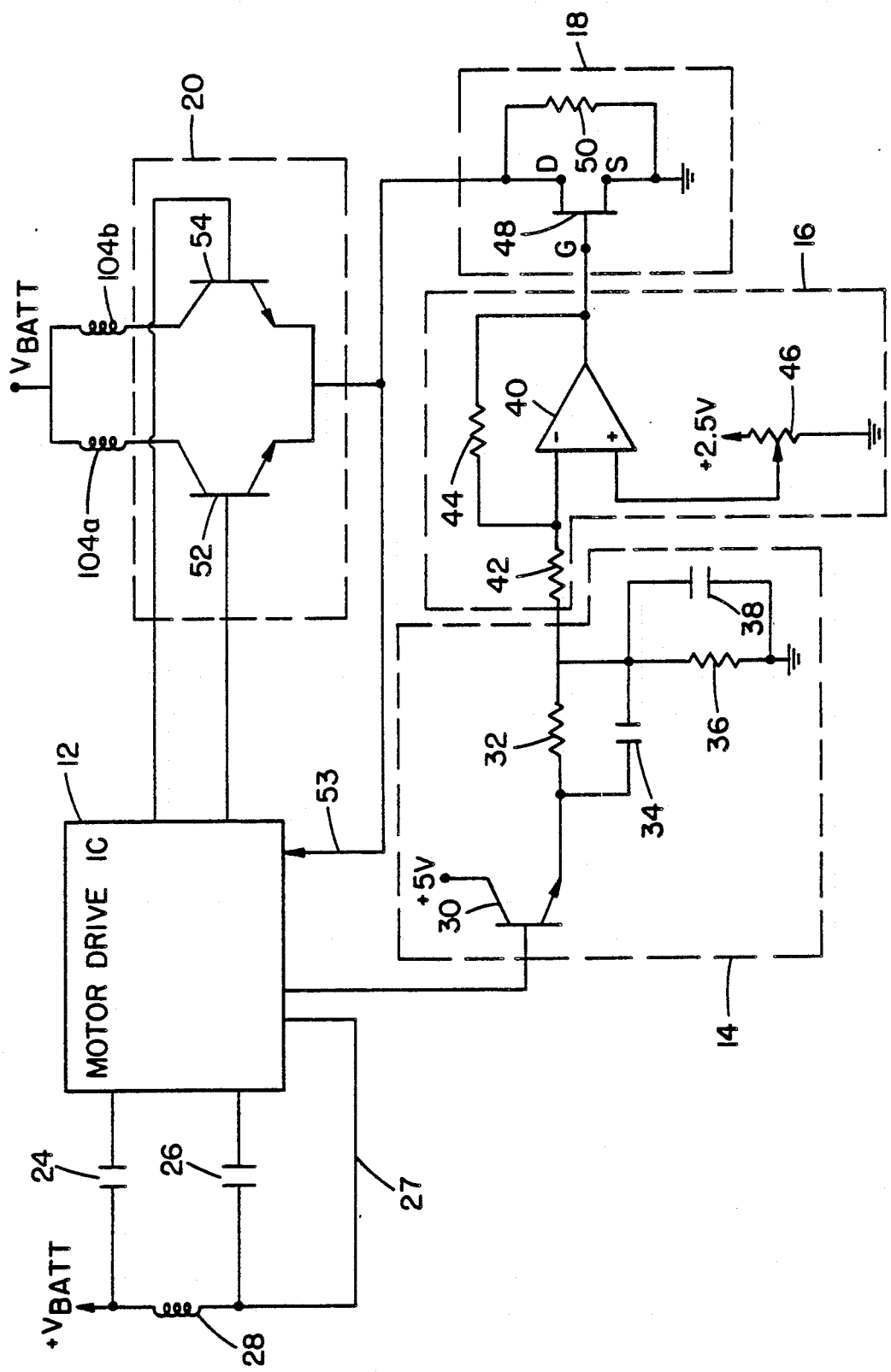
FIG. 2 is an electric circuit schematic of the motor amplitude regulator circuit of the present invention.

Referring to FIG. 2, it is shown that two capacitors 24 and 26 connected across the dc stator windings 28 are used to filter or attenuate the dc component of the generated voltage before entering the motor drive integrated circuit 12. The two capacitors 24 and 26 serve as attenuators to dc signals because of the nature of the impedance of capacitors at low frequency. As the signals entering capacitors 24 and 26 become lower in frequency, the more they are attenuated by the capacitors due to the fact that the impedance of the capacitors 24 and 26 increase as the frequency of the entering signals decreases. When the entering signal has zero frequency, such as with a dc signal, the capacitors 24 and 26 have infinite impedance and thus effectively block the dc term of the signal from passing through. Regardless of the capacitance of each of the capacitors 24 and 26, a constant dc signal shall not pass through. The motor drive integrated circuit supplies the 7 mA of regulated current to dc stator windings 28 via signal line 27.

Referring back to FIG. 1, it is shown that the motor drive integrated circuit 12 supplies a signal to peak detector circuit 14. The amplified generated voltage, which is a periodic signal, is output from the integrated circuit 12 and supplied to the peak detector circuit 14. The peak detector circuit 14 is commonly referred to as a peak rectifier circuit that outputs a dc equivalent of the peak values of the ac signal entering the peak detector circuit 14. Basically, the amplified periodic generated voltage from the motor drive integrated circuit 12 is converted into a dc voltage signal which is equal in magnitude to the positive peaks of the incoming amplified periodic generated voltage. Therefore, the dc voltage signal now contains the equivalent amplitude information that was contained in the amplitude of the amplified periodic generated voltage.

Returning to FIG. 2, the peak detector circuit 14 is shown comprising a bipolar junction transistor 30, two resistors 32 and 36 and two capacitors 34 and 38. In a basic configuration, the bipolar junction transistor 30, resistor 32 and capacitor 34 would only be used. Peak detector circuit 14 operates as follows As the input signal voltage increases towards a positive peak, the bipolar junction transistor 30 conducts current and charges up the capacitor 34 to the value of the peak voltage. However, in between positive peaks, the capacitor 34 supplies the current to resistor 42 and discharges exponentially with a time constant equal to the product of the resistance of resistor 32 and the capacitance of capacitor 34. Therefore, the output of the basic peak detector is not a perfect dc signal, and for this reason resistor 36 and capacitor 38 are added to the basic circuit. The parallel combination of resistor 36 and capacitor 38 provide additional compensation to the basic circuit thereby altering the time constant and allowing peak detector circuit 14 to output a smoother, more consistent dc voltage signal The concept and application of peak detector circuits or peak rectifier circuits is well known in the art of circuit design. The dc voltage signal output of peak detector circuit 14 is then sent to the input of differential amplifier circuit 16.

It is shown in FIG. 1 that the output of peak detector circuit 14 and a reference signal enter a differential amplifier 16. The differential amplifier 16 is a circuit that compares the two inputs and then outputs a voltage signal indicative of the comparison. Basically, if the reference voltage signal is greater than the input voltage, the output of the differential amplifier 16 is a large positive voltage, and if the input voltage is greater than the reference voltage, the output of the differential amplifier 16 is zero or a small positive voltage.

The voltage generated in the dc stator windings of the scanning motor has an amplitude relationship with the scanning motor amplitude of oscillation given by $$A_{GV} = (A_S)^2, \quad (2)$$

where $A_{GV}$ the amplitude of the generated voltage, and $A_S$ is the amplitude of motor shaft oscillation. Therefore, the generated voltage provides feedback information concerning the amplitude of oscillation of the scanning motor shaft, and thus by proper manipulation of this generated voltage, the amplitude of oscillation of the motor shaft can be controlled.

The reference signal entering the differential amplifier 16 is selected in order to achieve a certain amount of angular rotation of the motor shaft, in other words, the amplitude of shaft rotation can be set and controlled through the selection of the reference signal. The dc voltage signal exiting the peak detector circuit 14 has a magnitude equal to the amplitude of the amplified periodic generated voltage; therefore, it is also representative of the amplitude of oscillation of the motor shaft. By compensating for the square relationship between the amplitude or magnitude of the dc voltage signal and the amplitude of shaft rotation, it is possible to configure the differential amplifier 16 to output a voltage signal that will ultimately be used to control the amplitude of motor shaft oscillation.

Basically, the output of the differential amplifier 16 is an error signal that indicates to what extent the actual scanning motor oscillation amplitude differs from the desired oscillation amplitude. If the amplitude of the dc voltage signal is greater than the amplitude represented by the reference signal, then a zero valued or small positive valued voltage signal is output from the differential amplifier 16 thereby causing the scanning motor 22 to reduce its shaft oscillation amplitude. If, on the other hand, the amplitude of the dc voltage signal is less than the amplitude represented by the reference signal, then a large positive valued voltage signal is output from the differential amplifier 16 thereby causing the scanning motor 22 to increase its shaft oscillation amplitude. A detailed description of how the motor amplitude regulator circuit controls the amplitude of motor shaft rotation is given in subsequent paragraphs.

It is further shown in FIG. 2 that the differential amplifier 16 is comprised of an operational amplifier 40, two resistors 42 and 44 and a variable resistor, or potentiometer 46. Potentiometer 46 is used to set the amplitude or magnitude of the reference signal fed to operational amplifier 40. The voltage output of the differential amplifier 16 is given by $$V_o = \frac{R_A}{R_B}(V_R - V_I), \quad (3)$$

where
$R_a$ = resistance of resistor 44,
$R_s$ = resistance of resistor 42,
$V_r$ = reference voltage, and
$V_i$ = input voltage.

As mentioned previously and shown in equation (2) above, there is a square relationship between the amplitude of shaft oscillation and the amplitude of the dc voltage signal and thus the ratio of resistance given in the above equation is used to compensate for this relationship. The output of the differential amplifier 16, is sent into the voltage controlled resistance circuit 18. Basically, the output of the differential amplifier 16 is an error signal that is fed back into the control circuit to control the amplitude of motor shaft oscillation.

Voltage controlled resistance circuit 18 supplies a constant voltage to a current supply circuit 20. As seen in FIG. 2, the voltage controlled resistance circuit 18 comprises field effect transistor (FET) 48 with a resistor 50 connected across the drain (D) and source (S) terminals of the junction field effect transistor 48. As long as the transistor 48 operates in the triode region of operation, the transistor 48 operates as a linear resistance whose value is controlled by the gate-to-source (G-S) voltage of the transistor 48. Resistor 50 is used to set the maximum resistance of the transistor 48 by providing a set parallel resistance level. As the voltage increases at the gate input to the transistor 48, a larger drain current is drawn through the device as well as through resistor 50. The current through the parallel combination of resistor 50 and transistor 48 creates a voltage that is used by the current supply 20 shown in FIG. 1. As the voltage decreases at the gate input to the transistor 48, a smaller or zero valued drain current is drawn thereby creating a smaller or zero valued voltage across resistor 50. Therefore, the voltage created at the output of the voltage controlled resistance circuit 18 is directly proportional to the output of the differential amplifier and thus is indicative of the amplitude of oscillation of the motor shaft. The concept of using a FET as a voltage controlled resistance is a concept well known in the art.

Turning back to FIG. 1, the output of the voltage controlled resistance circuit 18 is fed into the current supply circuit 20 and to the motor drive integrated circuit 12. The interaction of the current supply circuit 20, the motor drive integrated circuit 12 and the scanning motor 22 is essential in the operation of the present invention. The voltage created at the output of the voltage controlled resistance circuit 18 and two triangular time-varying periodic waveforms supplied by the motor drive integrated circuit 12 control the current supply circuit 20, which in turn controls the current supplied to the ac stator winding of the scanning motor 22.

As stated previously, if the amplitude of the dc voltage signal is less then the amplitude represented by the reference signal, then a large positive valued signal is output from the differential amplifier 16. This voltage is indicative of the relationship between the desired amplitude of motor shaft oscillation and the actual amplitude of motor shaft oscillation. The large positive voltage indicates the actual motor shaft oscillation amplitude is less than the desired amplitude of oscillation. The large positive voltage at the output of the differential amplifier 16 causes a proportional reduction of resistance to appear at the output of the voltage controlled resistance circuit 18. The voltage is supplied to the current supply circuit 20 which in conjunction with the periodic time-varying waveforms supplied by the motor drive integrated circuit 12 causes more current to be drawn through the ac stator windings 104a and 104b, shown in FIG. 2, of the scanning motor 22, thereby causing the motor shaft to oscillate with a larger amplitude which eventually reduces the voltage difference at the input of the differential amplifier 16 to zero, thereby producing zero output. If, on the other hand, the amplitude of the dc voltage signal is greater than the amplitude represented by the reference signal, then a zero valued or small positive valued voltage signal is output from the differential amplifier 16 thus indicating that the motor shaft oscillation amplitude is too large. This small voltage signal at the output of the differential amplifier 16 causes a proportional voltage to appear at the output of the voltage controlled resistance circuit 18. The voltage is supplied to the current supply circuit 20 which in conjunction with the periodic time-varying waveforms supplied by the motor drive integrated circuit causes less current to be drawn through the ac stator windings 104a and 104b of the scanning motor 22, thereby causing the motor shaft to oscillate with a smaller amplitude which eventually reduces the voltage difference at the input of the differential amplifier 16 to zero, thereby producing zero output.

Referring now to FIG. 2, current supply circuit 20 is comprised of two bipolar transistors 52 and 54 connected at their respective emitter junctions. The resistance produced by the voltage controlled resistance circuit 18 appears at the emitter junctions of both transistors 52 and 54. The voltage across the base-emitter junctions of both transistors 52 and 54 causes an emitter current, $i_e$, flow in both transistors. The base of each transistor 52 and 54 receives the periodic time-varying triangular current waveforms from the motor drive integrated circuit 12. The collector terminal of the transistors 52 and 54 are connected to the ac stator windings 104a and 104b of the scanning motor. The current flow through the collector terminals and thus through the stator windings 104a and 104b is given by, $$i_c = i_e - i_b. \tag{4}$$

Thus one can see that when the voltage at the emitter junctions of the transistors 52 and 54 is decreased, then the current through the emitter junctions, $i_e$, is reduced thereby reducing the current through the collectors. It is important to note that the collector current, $i_c$, may be 100 times greater than the base current, $i_b$, and therefore, the magnitude of the collector current, $i_c$, is essentially equal to the magnitude of the emitter current, $i_e$. The frequency of the current supplied to the ac stator windings 104a and 104b however, is determined by the frequency of the base current, $i_b$, as generated by the motor drive integrated circuit 12. Signal line 53 is at the same voltage as the emitter junctions of the transistors 52 and 54 and supplies this voltage to the motor drive integrated circuit 12 as a feedback signal.

The motor drive integrated circuit which is the integrated circuit used in the motor control circuit disclosed in U.S. Pat. No. 4,496,831, supplies the current supply circuit 20 with two periodic time-varying triangular current waveforms. These waveforms control the frequency of the current supplied to the ac stator windings of the scanning motor 22 while the voltage supplied by the voltage controlled resistance circuit controls the magnitude of the current. In addition, integrated circuit 12 supplies the motor 22 with a constant dc current, the value of which is chosen in order to operate the motor 22 in a resonant mode. As stated previously, the point at which the resonant frequency of the motor equals the frequency of the driving current is resonance. The driving current is the current supplied to the ac stator winding and thus the frequency at which it is fed into the stator windings corresponds to the resonant frequency of the scanning motor 22.

As stated previously, the motor drive integrated circuit 12 can be replaced by discrete analog circuitry and thus any other type of signal generation means can be employed to generate the time-varying periodic triangular current waveforms. A bistable comparator circuit along with an integrator circuit can provide the desired waveform, but once again, it would require more space and is therefore less desirable than the integrated circuit 12.

The two periodic time-varying waveforms from the motor drive integrated circuit 12 are 180 degrees out of phase. In order to alternate the polarity of the magnetic poles of the ac stator windings, the ac stator windings are center-tapped, wherein each half is wound in a different direction. Therefore, one waveform energizes the first half of the ac stator windings to have a certain magnetic polarity, while the second waveform energizes the second half of the ac stator windings to have an opposite magnetic polarity. It is important to note that when one winding is energized the other winding is de-energized and this is due to the fact that the supplied waveforms are 180 degrees out of phase.

In order to better understand the principle involved, FIGS. 3, 4 and 5 show the position of the rotor 100 when the dc stator windings 102, and ac stator windings 104a and 104b are being energized and de-energized. Basically, when one half of the ac stator windings (104a or 104b) is receiving current in an increasing and then decreasing amount, corresponding to the positive and then negative slope of the triangular waveform, that particular half of stator windings develops an increasing and then decreasing magnetic field strength, while the second half of stator windings has no magnetic field strength. When the first half of ac stator windings has no magnetic field strength, the second half of the ac stator windings has an increasing and then decreasing magnetic field strength of opposite polarity FIG. 3 shows the rotor 100 aligned with the dc stator windings 102 while no signal is being sent to the ac stator windings 104a and 104b. FIG. 4 shows the rotor 100 aligning itself with ac stator windings 104a when it is at its peak magnetic field strength and ac stator windings 104b are at zero magnetic field strength FIG. 5 shows the rotor 100 aligning itself with ac stator windings 104b when it is at its peak magnetic field strength and ac stator windings 104a are at zero magnetic field strength. The current drawn through the ac stator windings 104a and 104b is directly proportional to the amplitude of the voltage supplied by the voltage controlled resistance circuit 18 and directly proportional to the magnetic field strength of the coils it is drawn through.

Figure 6:
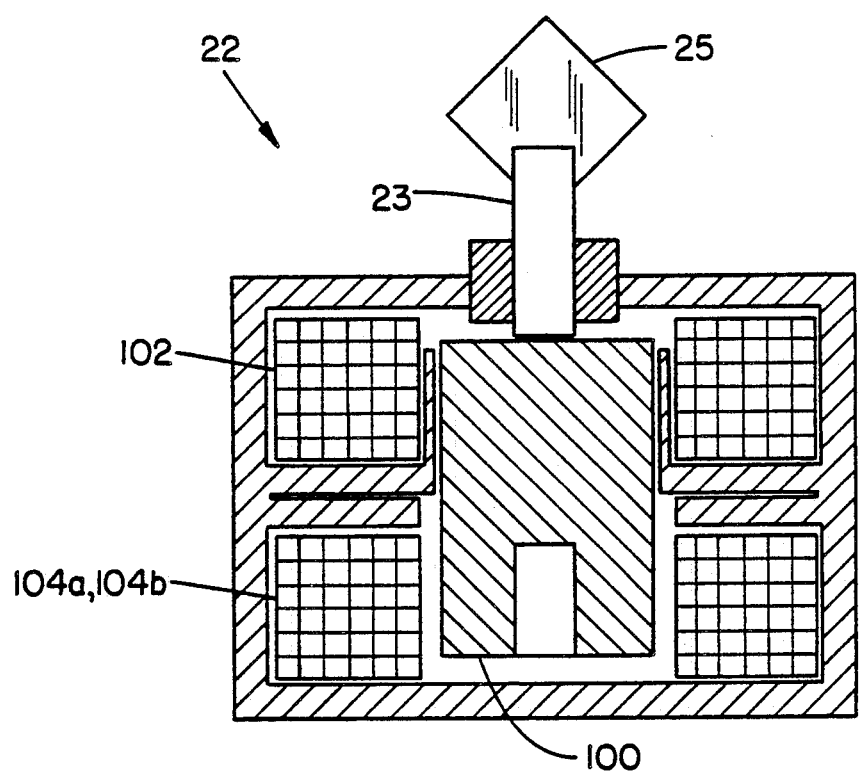
FIG. 6 is a cross-sectional view of the high speed scanning motor of the present invention.

FIG. 6 shows a cross-sectional view of the high speed scanning motor showing the permanent magnet rotor 100, dc stator windings 102, ac stator windings 104a and 104b, motor shaft 23 and a light reflecting means 25 attached thereto for joint oscillating motion therewith.

The interaction between the energization and de-energization of the ac stator coils allows for smooth rotation of the scanning motor shaft. The positive slope and then negative slope of the triangular waveforms allow smooth transition from one half of the ac stator windings 104a or 104b to the other, because as one half is decreasing in magnetic field strength, eventually to zero, the other will start at zero magnetic field strength and increase to full magnetic field strength. It is important to recall that the energization and de-energization of the ac stator windings is controlled by the amplitude of the generated voltage from the dc stator windings.

Therefore, the motor amplitude regulator of the present invention utilizes the generated voltage signal to supply amplitude information for controlling the motor from one internal signal, thereby saving space and reducing power consumption by eliminating the need to provide additional sensing elements. In addition, the frequency of motor shaft oscillation is set at or near resonace further conserving power.

Figure 7:
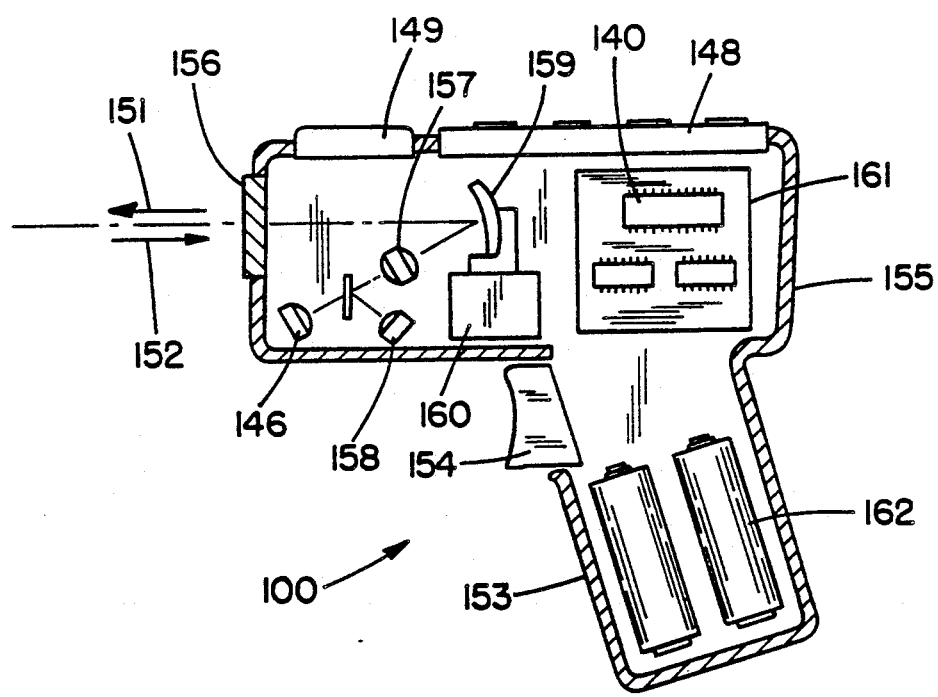
FIG. 7 depicts the lens system as mounted.

The present invention may be implemented in a hand-held, laser-scanning, bar code reader unit such as illustrated in FIG. 7. This hand-held device of FIG. 7 is generally of the style disclosed in U.S. Pat. No. 4,760,248, issued to Swartz et al, assigned to Symbol Technologies, Inc., and also similar to the configuration of a bar code reader commercially available as part number LS 8100 from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 7. These patents 4,760,248, 4,387,297 and 4,409,470 are incorporated herein by reference. A outgoing light beam 151 is generated in the reader 100, usually by a laser diode or the like, and directed to impinge upon a bar code symbol a few inches from the front of the reader unit. The outgoing beam 151 is scanned in a fixed linear pattern, and the user positions the hand-held unit so this scan pattern traverses the symbol to be read. Reflected light 152 from the symbol is detected by a light-responsive device 146 in the reader unit, producing serial electrical signals to be processed for identifying the bar code. The reader unit 100 is a gun shaped device, having a pistol-grip type of handle 153 and movable trigger 154 is employed to allow the user to activate the light beam 151 and detector circuitry when pointed at the symbol to be read, thereby saving battery life if the unit is self-powered. A lightweight plastic housing 155 contains the laser light source, the detector 146, the optics and signal processing circuitry, and the CPU 140 as well as a battery 162. A light-transmissive window 156 in the front end of the housing 155 allows the outgoing light beam 151 to exit and the incoming reflected light 152 to enter. The reader 100 is designed to be aimed at a bar code symbol by the user from a position where the reader 100 is spaced from the symbol, i.e., not touching the symbol or moving across the symbol. Typically, this type of hand-held bar code reader is specified to operate in the range of perhaps several inches.

As seen in FIG. 7, a suitable lens 157 (or multiple lens system) is used to collimate and focus the scanned beam into the bar code symbol at an appropriate reference plane, and this same lens 157 may be used to focus the reflected light 152. A light source 158 such as a semiconductor laser diode is positioned to introduce a light beam into the axis of the lens 157 by a partially-silvered mirror and other lenses or beam-shaping structure as needed, along with an oscillating mirror 159 which is attached to a scanning motor 160 activated when the trigger 154 is pulled. If the light produced by the source 158 is not visible, an aiming light may be included in the optical system, again employing a partially-silvered mirror to introduce the beam into the light path coaxially with the lens 157. The aiming light, if needed, produces a visible-light spot which is scanned just like the laser beam; the user employs this visible light to aim the reader unit at the symbol before pulling the trigger 154.

Although the present invention has been described with respect to linear or single line bar codes, it is not limited to such embodiments, but may also be applicable to more complex scanning patterns and to stacked or two dimensional bar codes such as Code 49 and similar symbologies. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser-/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in it is not intended to be limited to the details shown, since various modifications and structural changes may be made without departing in any way from the spirit of the present invention.

For example, although the present invention is described in its preferred embodiment as relating to the decoding of bar code symbols in which the detected representation of a character is either decodable or not decodable according to some single acceptability criteria, the invention may also be applied to detection of indicia having a multiple threshold level of acceptability ranging from an unacceptable or "distorted" representation of a image to an acceptable or "clear" representation of the image. The iterative process may be defined as attempting to correct portions of the scanned image from relatively distorted to relatively clear in a sequence of steps.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adaptions should and are intended to be comprehended within the meaning and range of equivalence of the following claims.

What is claimed is:

1. A miniature, hand-held scanning device for repetitively scanning a target, said device having a laser beam generating means, at least one high speed scanning motor, and a motor amplitude regulator circuit for controlling said scanning motor, said motor amplitude regulator circuit comprising means for operating said scanning motor at resonance, and means for automatically controlling the amplitude of oscillation of the shaft of said scanning motor, said controlling means being driven from a single feedback signal obtained from the scanning motor.

2. The scanning device of claim 1, wherein said motor amplitude regulator circuit further includes means coupled to the scanning motor for obtaining a generated voltage induced within direct current stator windings of said scanning motor to function as said single feedback signal and for providing said generated voltage to said circuit means.

3. The scanning device of claim 1 wherein said circuit means is a feedback system comprising:
 a means for obtaining and amplifying an induced generated voltage from the direct current stator windings of the scanning motor to function as said single feedback signal;
 a peak detector means for converting said amplified generated voltage to a direct current voltage signal;
 a different amplifier means for comparing said direct current voltage signal with a reference signal and providing an error signal output;
 a variable controlled resistance means for providing a variable direct current voltage signal from said error signal output; and
 a controlled power supply means for supplying a periodic current waveform to the ac stator windings of the scanning motor in response to said error signal to adjust the amplitude of said scanning motor shaft oscillation.

4. The scanning device of claim 3 wherein said feedback system further includes a means for providing a regulated current to the dc stator windings of said scanning motor.

5. A miniature, hand-held scanning device for repetitively scanning a target with laser light, said device having a laser beam generating means and at least one high speed scanning motor, said motor having a stator, dc stator windings, ac stator windings, a rotor, a shaft connected to said rotor having light reflecting means attached thereto and being operable to oscillate in alternate circumferential directions, and a motor amplitude regulator circuit for automatically controlling the amplitude of oscillation of the shaft of said scanning motor and for operating said motor at or near resonance, said circuit comprising:

feedback means coupled to the dc stator windings for obtaining a feedback signal, said feedback signal being a generated voltage induced in the dc stator windings;

amplitude error signal means coupled to said feedback means for comparing said feedback signal with a reference signal having a predetermined voltage to output an amplitude error signal representative of a difference between the amplitude of oscillation of the shaft of the scanning motor and the reference signal; and motor control means coupled to said error signal means and the ac stator windings for adjusting the amplitude of oscillation of the shaft of said scanning motor in response to the amplitude error signal.

6. The scanning device of claim 5 wherein said feedback means includes a motor drive integrated circuit for amplifying the induced generated voltage.

7. The scanning device of claim 6 wherein said motor drive integrated circuit includes a regulated current supply means for providing said dc stator windings of the scanning motor with a regulated current.

8. The scanning device of claim 6 wherein said feedback means further includes a peak detector circuit means for converting the induced generated voltage into a dc voltage signal.

9. The scanning device of claim 5 wherein said amplitude error signal means includes a differential amplifier for comparing the induced generated voltage and the reference signal to provide said amplitude error signal.

10. The scanning device of claim 9 wherein said amplitude error signal means further includes a voltage controlled resistance means for providing a constant dc voltage controlled resistance means for providing a constant dc voltage signal to said motor control means from said error signal means.

11. The scanning device of claim 5 wherein said motor control means includes a current supply means which supplies periodic current waveforms from said motor drive integrated circuit to said scanning motor to control the amplitude of oscillation of the shaft of said scanning motor.

12. A method for repetitively scanning a target with light by automatically controlling the amplitude of oscillation of a scanning motor having light reflective means mounted on a shaft thereof, comprising:

obtaining a single feedback signal from the scanning motor;

and adjusting the amplitude of oscillation of the motor shaft in response to the single feedback signal.

13. The method of claim 12 wherein the step of obtaining a single feedback signal includes obtaining a generated voltage induced within the dc stator windings of the scanning motor.

14. The method of claim 12 wherein said adjusting step comprises comparing the amplitude of said feedback signal to a reference signal having a predetermined amplitude and changing the current supplied to the ac stator windings of the scanning motor to reduce a difference in the amplitudes of the feedback and reference signals.

15. A method for repetitively scanning a target with light by automatically controlling the amplitude of oscillation of a scanning motor, said motor having a stator, dc stator windings, ac stator windings, a rotor and a shaft connected to the rotor having a light reflective means mounted thereon and being operable to oscillate in alternate circumferencial directions, said method comprising:

obtaining a feedback signal from the dc stator windings, said feedback signal being a generated voltage induced in the dc stator windings;

combining said feedback signal with a reference signal having a predetermined amplitude to output an amplitude error signal representative of the difference between the amplitude of oscillation of the shaft of the scanning motor and the reference signal amplitude; and adjusting the amplitude of oscillation of the scanning motor shaft in response to the amplitude error signal.

16. The method of claim 15 wherein the step of obtaining said feedback signal includes amplifying the generated voltage.

17. The method of claim 16 wherein the step of obtaining said feedback signal further includes converting said induced voltage into a dc voltage signal.

18. The method of claim 15 wherein said combining step comprises comparing the generated voltage and a reference signal to provide said amplitude error signal.

19. The method of claim 15 wherein said combining step further comprises providing a constant dc voltage signal to current supply means, said current supply means outputting periodic current waveforms to said ac stator windings of said scanning motor to control the amplitude of said motor shaft oscillation.

* * * * *